(12) United States Patent
Kuhn et al.

(10) Patent No.: US 8,974,949 B2
(45) Date of Patent: Mar. 10, 2015

(54) ELECTRICAL INSULATOR SHAPED TO CONFORM TO POWER SOURCE ELECTRODES

(75) Inventors: Peter Jay Kuhn, St. Paul, MN (US); Brad Whitney, Circle Pines, MN (US); Matthew Wappel, Maplewood, MN (US); Vanessa Mitchell, Stillwater, MN (US); Kyle Richard Chlan, Arden Hills, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 193 days.

(21) Appl. No.: 13/435,240

(22) Filed: Mar. 30, 2012

(65) Prior Publication Data

US 2012/0270091 A1     Oct. 25, 2012

Related U.S. Application Data

(60) Provisional application No. 61/472,970, filed on Apr. 7, 2011.

(51) Int. Cl.

| | |
|---|---|
| *H01M 6/12* | (2006.01) |
| *H01G 9/06* | (2006.01) |
| *H01G 9/08* | (2006.01) |
| *H01M 6/46* | (2006.01) |
| *H01M 2/02* | (2006.01) |
| *H01M 2/22* | (2006.01) |
| *H01M 2/26* | (2006.01) |
| *H01M 10/04* | (2006.01) |

(52) U.S. Cl.
CPC . *H01G 9/06* (2013.01); *H01G 9/08* (2013.01); *H01M 6/46* (2013.01); *H01M 2/0277* (2013.01); *H01M 2/22* (2013.01); *H01M 2/266* (2013.01); *H01M 10/0468* (2013.01); *H01M 10/0477* (2013.01); *H01M 10/049* (2013.01); *H01M 2/026* (2013.01); *H01M 2220/30* (2013.01)
USPC .......................... 429/154; 429/153; 429/155

(58) Field of Classification Search
USPC .......................................... 429/153, 154, 155
See application file for complete search history.

(56) References Cited

U.S. PATENT DOCUMENTS

| | | | |
|---|---|---|---|
| 4,385,342 A | 5/1983 | Puppolo et al. | |
| 4,509,100 A | 4/1985 | Puppolo | |
| 4,934,306 A * | 6/1990 | Rudolph | ........................ 118/58 |
| 5,131,388 A | 7/1992 | Pless et al. | |
| 5,439,760 A | 8/1995 | Howard et al. | |
| 6,032,075 A | 2/2000 | Pignato et al. | |
| 6,275,729 B1 | 8/2001 | O'Phelan et al. | |
| 6,297,943 B1 | 10/2001 | Carson | |

(Continued)

*Primary Examiner* — Stewart Fraser
*Assistant Examiner* — Olatunji Godo
(74) *Attorney, Agent, or Firm* — Schwegman Lundberg & Woessner, P.A.

(57) ABSTRACT

One example includes a plurality of substantially planar electrodes disposed in a stack, in alignment, the stack being at least partially disk-shaped with a first major face opposing a second major face, with an edge extending between the first major face and the second major face, a pocket, with a covered portion of the stack disposed in the pocket, the pocket shaped to conform to the stack with a first portion of the pocket covering a first segment of the first major face, a second portion covering a second segment of the second major face opposite the first segment, and an edge portion covering the edge of the stack, wherein a remaining portion of the stack extends out of the pocket and a film disposed over the remaining portion of the stack, substantially covering the remaining portion.

14 Claims, 10 Drawing Sheets

(56) References Cited

U.S. PATENT DOCUMENTS

| | | |
|---|---|---|
| 6,678,559 B1 | 1/2004 | Breyen et al. |
| 6,795,729 B1 | 9/2004 | Breyen et al. |
| 6,801,424 B1 | 10/2004 | Nielsen et al. |
| 6,836,683 B2 | 12/2004 | Nielsen et al. |
| 6,839,224 B2 | 1/2005 | O'Phelan et al. |
| 6,967,828 B2 | 11/2005 | Miltich et al. |
| 7,012,799 B2 | 3/2006 | Muffoletto et al. |
| 7,085,126 B2 | 8/2006 | Muffoletto et al. |
| 7,092,242 B1 | 8/2006 | Gloss et al. |
| 7,110,240 B2 | 9/2006 | Breyen et al. |
| 7,196,899 B1 | 3/2007 | Feger et al. |
| 7,242,572 B2 | 7/2007 | Norton et al. |
| 7,342,774 B2 | 3/2008 | Hossick-Schott et al. |
| 7,385,802 B1 | 6/2008 | Ribble et al. |
| 7,404,829 B1 | 7/2008 | Feger et al. |
| 7,426,104 B2 | 9/2008 | Dombro et al. |
| 7,474,521 B2 | 1/2009 | Hossic-Schott |
| 7,483,260 B2 | 1/2009 | Ziarniak et al. |
| 7,491,246 B2 | 2/2009 | Hossick-Schott et al. |
| 7,499,260 B2 | 3/2009 | Schott et al. |
| 7,531,010 B1 | 5/2009 | Feger et al. |
| 7,555,339 B2 | 6/2009 | Nielsen et al. |
| 7,570,996 B2 | 8/2009 | Crespi et al. |
| 7,575,148 B2 | 8/2009 | Kubouchi et al. |
| 7,589,956 B2 | 9/2009 | Norton et al. |
| 7,667,954 B2 | 2/2010 | Lessner et al. |
| 7,684,171 B2 | 3/2010 | Rorvick et al. |
| 7,699,899 B2 | 4/2010 | Dombro et al. |
| 7,715,174 B1 | 5/2010 | Beauvais et al. |
| 7,733,631 B2 | 6/2010 | Brabeck et al. |
| 7,785,741 B2 | 8/2010 | Viavattine |
| 2006/0222937 A1* | 10/2006 | Morimoto et al. ............ 429/164 |
| 2011/0159328 A1 | 6/2011 | Yeo |
| 2011/0195301 A1 | 8/2011 | Taniguchi et al. |

* cited by examiner

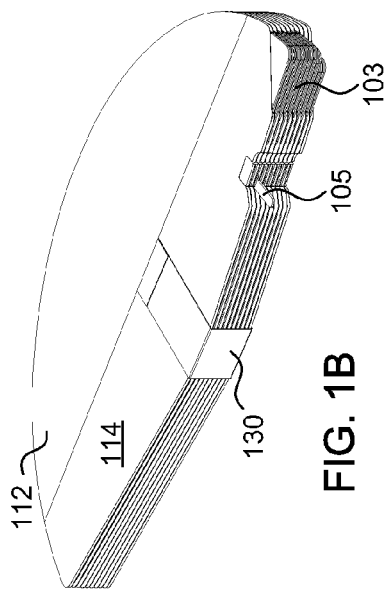
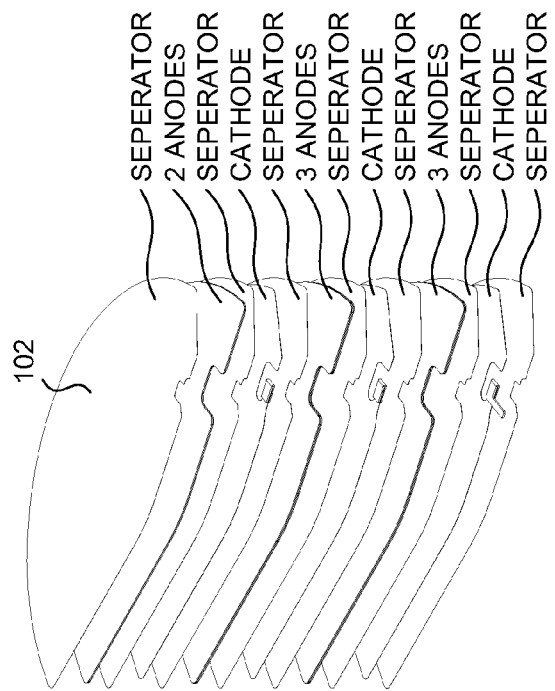
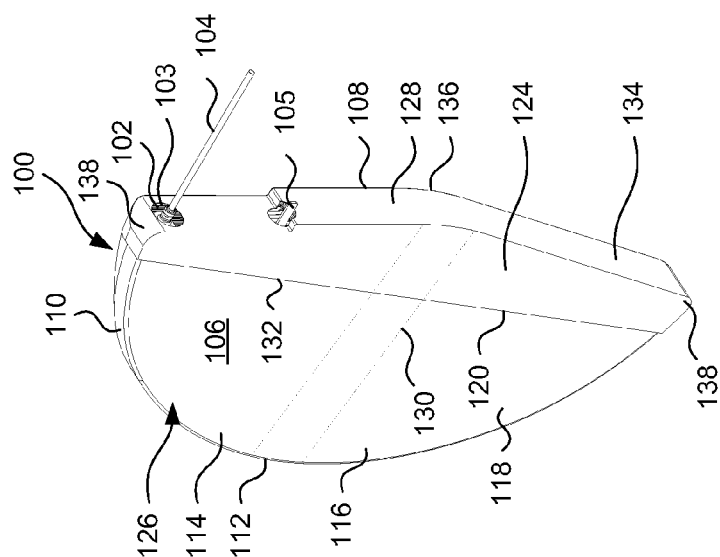

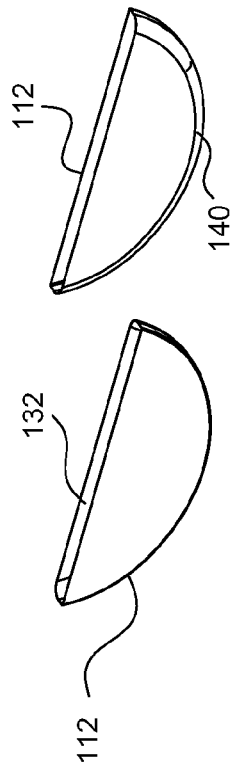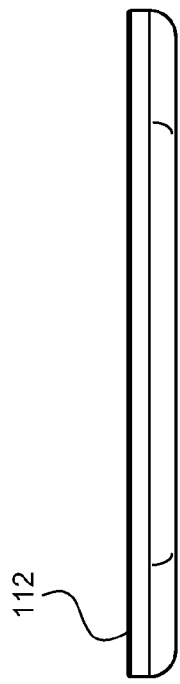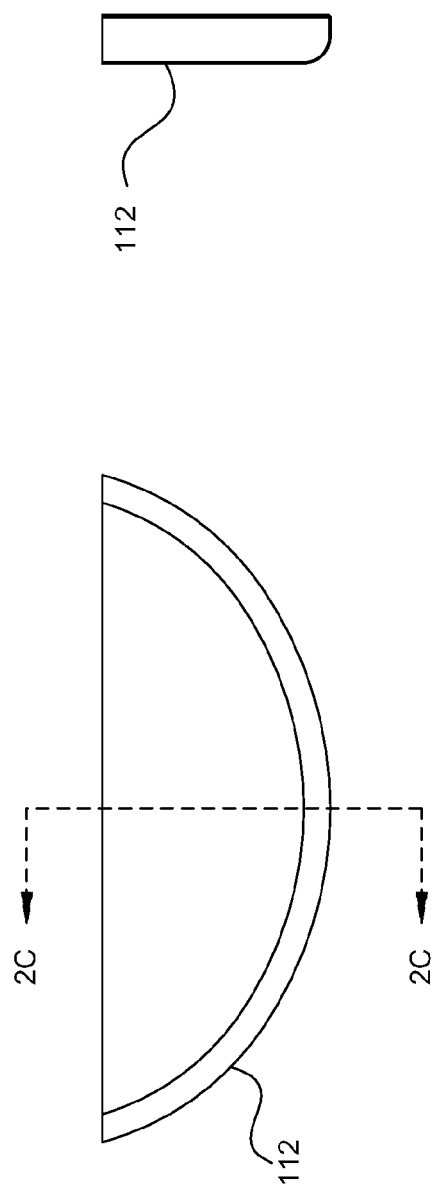

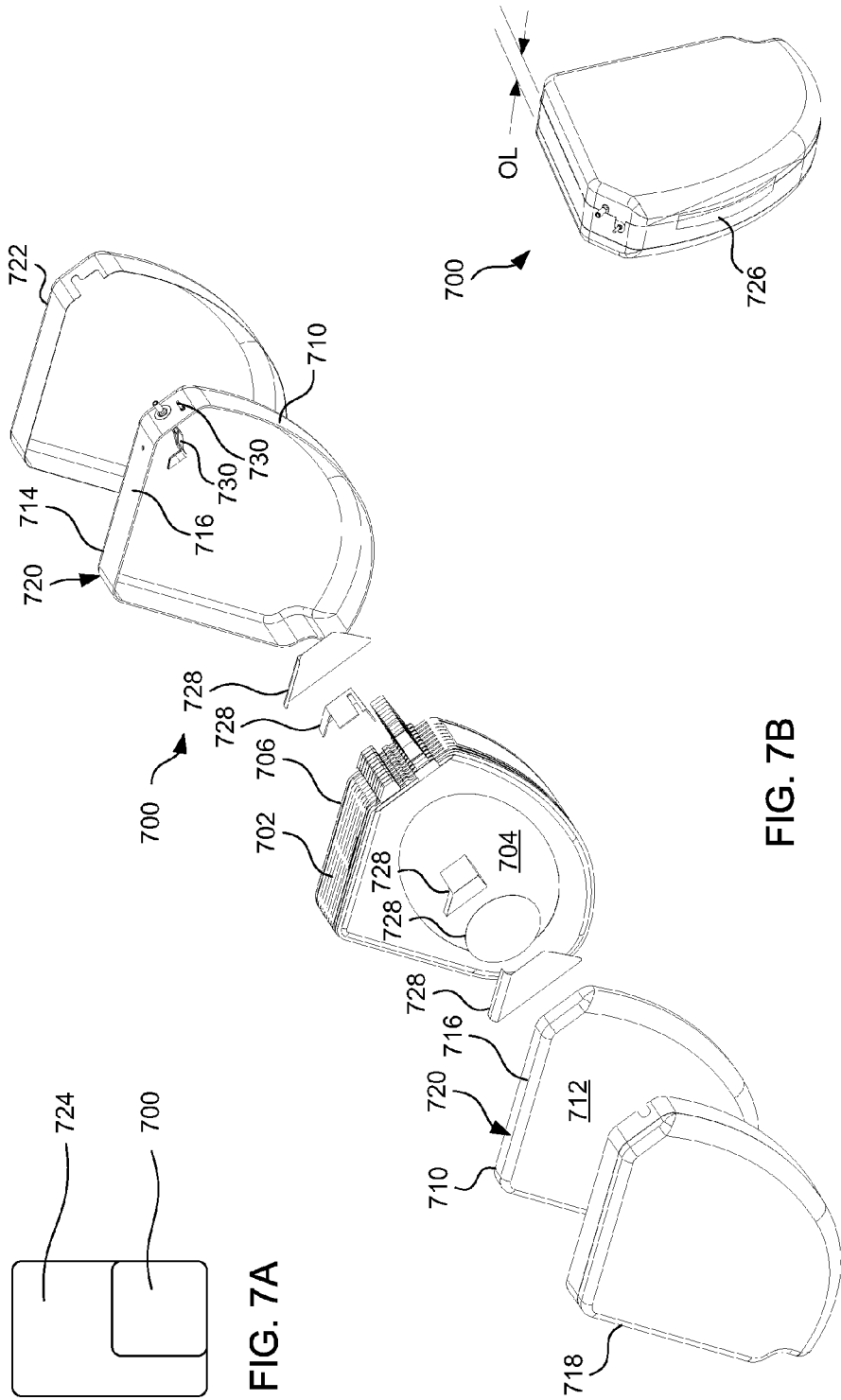

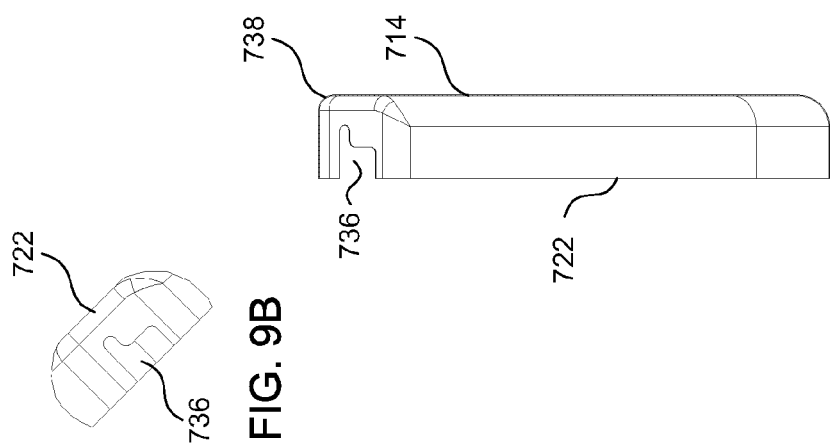
FIG. 9B
FIG. 9C
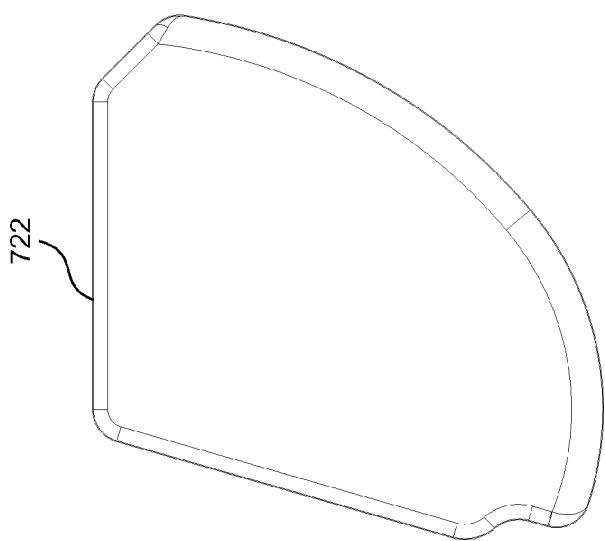
FIG. 9A

ELECTRICAL INSULATOR SHAPED TO CONFORM TO POWER SOURCE ELECTRODES

CROSS-REFERENCE TO RELATED APPLICATION

This application claims the benefit of U.S. Provisional Application No. 61/472,970, filed on Apr. 7, 2011, under 35 U.S.C. §119(e), which is hereby incorporated by reference in its entirety.

TECHNICAL FIELD

This document relates generally to energy storage and more particularly to an electrical insulator shaped to conform to power source electrodes.

BACKGROUND

Implantable medical devices are used to detect, prevent and/or treat patient disorders. Devices, such as cardiac rhythm management devices, such as neurostimulation devices, deliver one or more electrical stimuli to patient tissue. Some devices are self-powered and include an on-board power source. In some instances, if a large amount of energy is to be delivered to tissue quickly, a large capacitor is used to store and deliver electrical energy. If energy is delivered to tissue over a longer time, batteries are used in some instances. Batteries and capacitors are used for other functions as well, such as to power electronics including electronics for communication between the implanted device and another device, such as an external programmer.

There is an interest in making these devices physically smaller. Consequently, electrical components become more compact. However, this can bring about additional problems. One problem relates to constraining subcomponent layers in power sources such as batteries and capacitors. An additional problem relates to physically and electronically separating power sources from other devices within a component. This problem is apparent in instances in which a power source includes a conductive housing that can short out other electrical components.

SUMMARY

One example includes a method for constructing a power source that includes stacking a plurality of substantially planar electrodes into a stack, in alignment, the stack having a plate-shape with a first major face opposing a second major face, with an edge extending between the first major face and the second major face. The example includes pinching a first pocket edge of a pocket toward a second pocket edge of the pocket, opposite the first pocket edge, such that a first pocket major face of the pocket, that extends between the first pocket edge and the second pocket edge, separates from a second pocket major face of the pocket that also extends between the first pocket edge and the second pocket edge and disposing the stack partially into the pocket. The example includes releasing the pinching. The example includes pushing the stack further into the pocket, until the pocket conforms to the stack. The example includes affixing a film to a remainder of the stack to substantially cover the remainder of the stack.

One example includes an apparatus that includes a plurality of substantially planar electrodes disposed in a stack, in alignment, the stack being at least partially disk-shaped with a first major face opposing a second major face, with an edge extending between the first major face and the second major face. The example includes a pocket, with a covered portion of the stack disposed in the pocket, the pocket shaped to conform to the stack with a first portion of the pocket covering a first segment of the first major face, a second portion covering a second segment of the second major face opposite the first segment, and an edge portion covering the edge of the stack, wherein a remaining portion of the stack extends out of the pocket. The example includes a film disposed over the remaining portion of the stack, substantially covering the remaining portion.

One example includes an apparatus that includes a plurality of substantially planar electrodes disposed in a stack, in alignment, with a first major face opposing a second major face, with an edge extending between the first major face and the second major face. The example includes a power source case, the stack disposed in the power source case, the power source case having a first exterior face shaped to conform to the first major face and a second exterior face shaped to conform to the second major face, with an exterior edge shaped to conform to the edge of the stack. The example includes a first shell shaped to conform to an exterior of the power source case, covering the first exterior face and a portion of the exterior edge. The example includes a second shell shaped to conform to the exterior of the power source case, covering the second exterior face and a remainder of the exterior edge. The example includes a device housing, with the power source case disposed in the device housing. In the example, the first shell and the second shell physically and electrically insulate the power source case from the device housing.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

The drawings illustrate generally, by way of example, various examples discussed in the present document. The drawings are for illustrative purposes only and may not be to scale.

FIG. 1A is a perspective view of a power source stack covered with a pocket and a film, according to some examples.

FIG. 1B is a perspective view of a power source stack covered with a pocket and a film, according to some examples.

FIG. 1C is a perspective view of a power source stack covered with a pocket and a film, according to some examples.

FIG. 2A is a front view of a pocket, according to some examples.

FIG. 2B is a top view of the pocket of FIG. 1A.

FIG. 2C is a right view of the pocket of FIG. 1C.

FIG. 2D is a perspective back view of the pocket of FIG. 1A.

FIG. 2E is a perspective view of the pocket of FIG. 1A.

FIG. 7A is a schematic of an implantable medical device including a power source, according to some examples.

FIG. 7B is an exploded view of a power source including first and second shells, according to some examples.

FIG. 7C is an assembled view of the power source of FIG. 7A.

FIG. 9A is a front view of a first shell as illustrated in FIG. 7B.

FIG. 9B is a partial top-right view of a first shell as illustrated in FIG. 7B.

FIG. 9C is a side view of a first shell as illustrated in FIG. 7B.

DETAILED DESCRIPTION

Figure 3B:
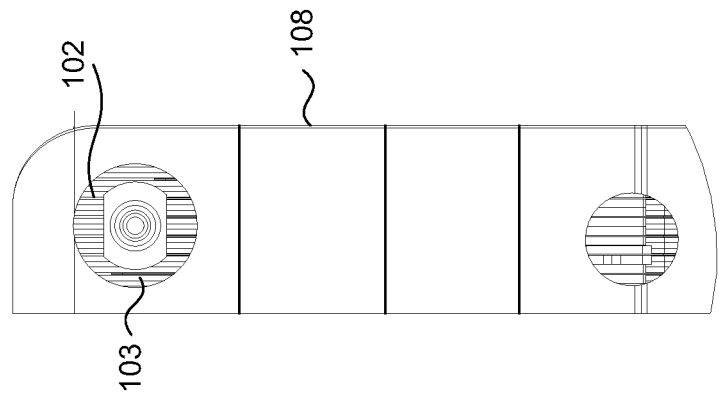
FIG. 3B is a section view of 3B as shown in FIG. 3A.

The following detailed description of the present invention refers to subject matter in the accompanying drawings that show, by way of illustration, specific aspects and examples in which the present subject matter may be practiced. These examples are described in sufficient detail to enable those skilled in the art to practice the present subject matter. References to "an", "one", or "various" examples in this disclosure are not necessarily to the same example, and such references contemplate more than one example. The following detailed description is, therefore, not to be taken in a limiting sense, and the scope is defined only by the appended claims, along with the full scope of legal equivalents to which such claims are entitled.

Some power sources used in implantable medical devices, such as batteries and capacitors, include a stack of electrodes disposed in a case. A stack of electrodes includes one or more anode layers and one or more cathode layers, with anodes separated from cathodes by separators, according to some examples. In several examples, layers of the stack are aligned with one another. In some examples, the layers are physically constrained in alignment by a constraint device such as by a pocket, shell, film, tape, or a combination of these, as described herein.

There are several benefits provided by examples disclosed herein. In processing, some examples enable assembly personnel or machinery to pinch and handle the stack while maintaining stack alignment. In use, the constrained electrodes are secure in their position inside of an implantable medical device. Some examples reduce instances of electrode contact with the inside of the case.

In some instances, electrodes are formed of small layers that are vulnerable to bending or breaking Accordingly, physical influence, such as to constrain the layers, either with a device or by hand, risks bending or breaking the electrodes. To address this, some examples provide stable constraint of electrode layers, protecting them from damage. Some of the examples discussed herein are easier to use, inexpensive and reliable, when compared to traditional approaches.

Additionally, some examples are useful to electrically isolate a case from adjacent items. In some instances, the case is metallic, and may be hermetically sealed. When packaged in an implantable medical device with other components, such a case could undesirably form a conductive path between two other components. Accordingly, some examples provide one or more devices to insulate the case from other components. An additional benefit of such a device is that it absorbs mechanical energy in use, such as energy caused by vibration. In some instances, such a device is pliable, allowing for easy assembly by a pincher or pinching device, such as an operator hand, and providing a forgiving exterior dimension, which additionally provides for easy assembly.

In various examples, a fill port or tube is coupled with the case and allows introduction of electrolyte into the case. Electrolyte is a medium that facilitates ionic transport during discharge and segregation during charge. Some examples provide uniform ionic transport between electrodes by surrounding the stack with the electrolyte. Absorption of the electrolyte into the stack occurs through a process that draws the electrolyte into and out of the case via the fill port, in certain examples. Introduction of electrolyte is repeated in some examples to encourage wetting of separators and electrodes. During introduction, some conventional outer liners may become repositioned in a manner that may partially block the fill port and restrict flow of electrolyte and/or gas via the fill port. Accordingly, some examples provide a constraint that addresses this issue such as by reducing instances of flow obstruction.

FIG. 1 is a perspective view of a power source 100. Various examples include a plurality of substantially planar electrodes disposed in a stack 102. In some examples, the electrodes are in alignment with one another, such as to define a planar surface 103 for interconnection to a terminal, such as an anode terminal 104 or a cathode terminal 105. In certain examples, one or more of the electrodes form a terminal.

In some instances, the stack 102 is at least partially disk-shaped as pictured and described in relation to FIG. 1. In some examples, the stack 102 includes a first major face 106 opposing a second major face 108, with an edge 110 extending between the first major face 106 and the second major face 108. Various examples include a pocket 112 that is pliable in some instances. In certain examples, the pocket 112 comprises a molded shape, but the present subject matter is not so limited, and includes shapes formed by dipping or otherwise. In various examples, the pocket 112 includes fluorinated ethylene propylene.

In various examples, the pocket 112 covers a covered portion 114 of the stack 102. In various examples, the stack 102 is disposed in the pocket 112 with the pocket 112 shaped to conform to the stack 102. In some examples, a first portion 116 of the pocket 112 covers a first segment 118 of the first major face 106. A segment as used herein incorporates the definition related to geometry. The figure shows a chord 120 of the first segment 118. The pocket 112 extends to the chord 120 in various examples. A chord as used herein incorporates the definition related to geometer. Opposite the first portion 116, a second portion covers a second segment of the second major face 108 opposite the first segment. In some instances, an edge portion 122 of the pocket 112 covers the edge 110 of the stack 102. In various examples, a remaining portion 124 of the stack 102 extends out of the pocket 112.

In various examples, the first major face 106 defines a total segment area 126 that is less than a semi-circle of the disk-shape of the power source 100. In certain examples, the pocket 112 covers a small segment portion such as covered portion 114 smaller than the total segment.

Various examples include a film 128 disposed over the stack 102. In some examples, the film 128 is disposed over the remaining portion 124 of the stack 102. In some examples, the film 128 substantially covers the remaining portion 124. In certain examples, the film 128 includes thermoformed material.

In some instances, a film includes material banded around the stack 102 in a band 130. In some examples, the band 130 is taped around the stack 102. In certain examples, the band 130 is heat-shrunk around the stack 102. In some examples, the band 130 extends along the covered portion 114 of the stack 102. In some instances, the band 130 extends along the remaining portion 124 of the stack. In various examples, the band 130 bundles the electrodes together. In certain examples the band is formed of fluorinated ethylene propylene, but the present subject matter is not so limited.

In some examples, the pocket 112 defines an opening 132. In some examples, the opening 132 has an opening perimeter. The stack, in certain examples, defines a planar portion of the edge 134. In some instances, the planar portion of the edge 134 is substantially parallel the opening 132. In some examples, the planar portion of the edge 134 has a perimeter 136 larger than the opening perimeter. In certain examples, the film 128 is shaped to conform to the planar portion of the edge 134. In some examples, the film 128 extends to curved portions of the edge 138 of the stack 102. In certain instances, the film 128 is bunched 144 at least partially around the curved portions of the edge 138. In some instances, the curved portions of the edge 138 form a part of the remaining portion 124. The curved portions of the edge 138 extend between the first major face 106 and the second major face 108 in certain examples. The film 128 is a thermoformed film shaped to conform to the planar portion of the edge 134 and to the curved portions of the edge 138 of the remaining portion 114 extending between the first major face 106 and the second major face 108.

FIGS. 2A-E provide several views of a pocket, such as the pocket in FIG. 1, according to some examples. FIG. 2E shows that in some examples, the pocket 112 includes a 140. The contour shape illustrated is one example of a contour shape, and other contour shapes are possible. Some examples include multiple contour shapes. Contour shapes accommodate similarly contoured stack shapes, in some examples, such that the pocket conforms to the contour of the stack.

Figure 3A:
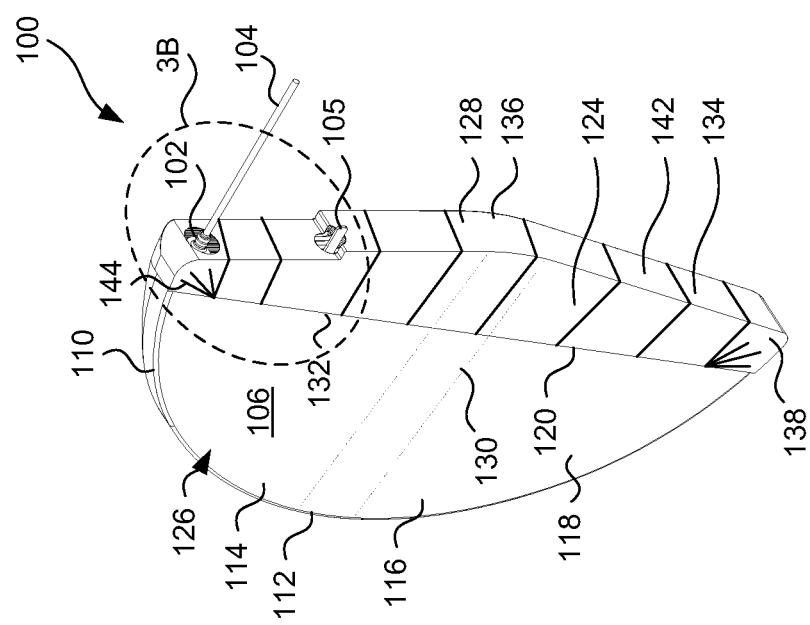
FIG. 3A is a perspective view of a power source stack covered with a pocket and tape, according to some examples.

FIGS. 3A-B provide views of a power source stack covered with a pocket and tape, according to some examples. Various examples include one or more sections or strips of tape 142. In various examples, the tape 142 couples the pocket 112 to stack 102, such as by extending from one side of the pocket 112, over the remainder portion 114, to the other side of the pocket 112. Tape 142 optionally includes an adhesive such as a pressure sensitive adhesive, but the present subject matter is not so limited and includes other adhesives.

Figure 4:
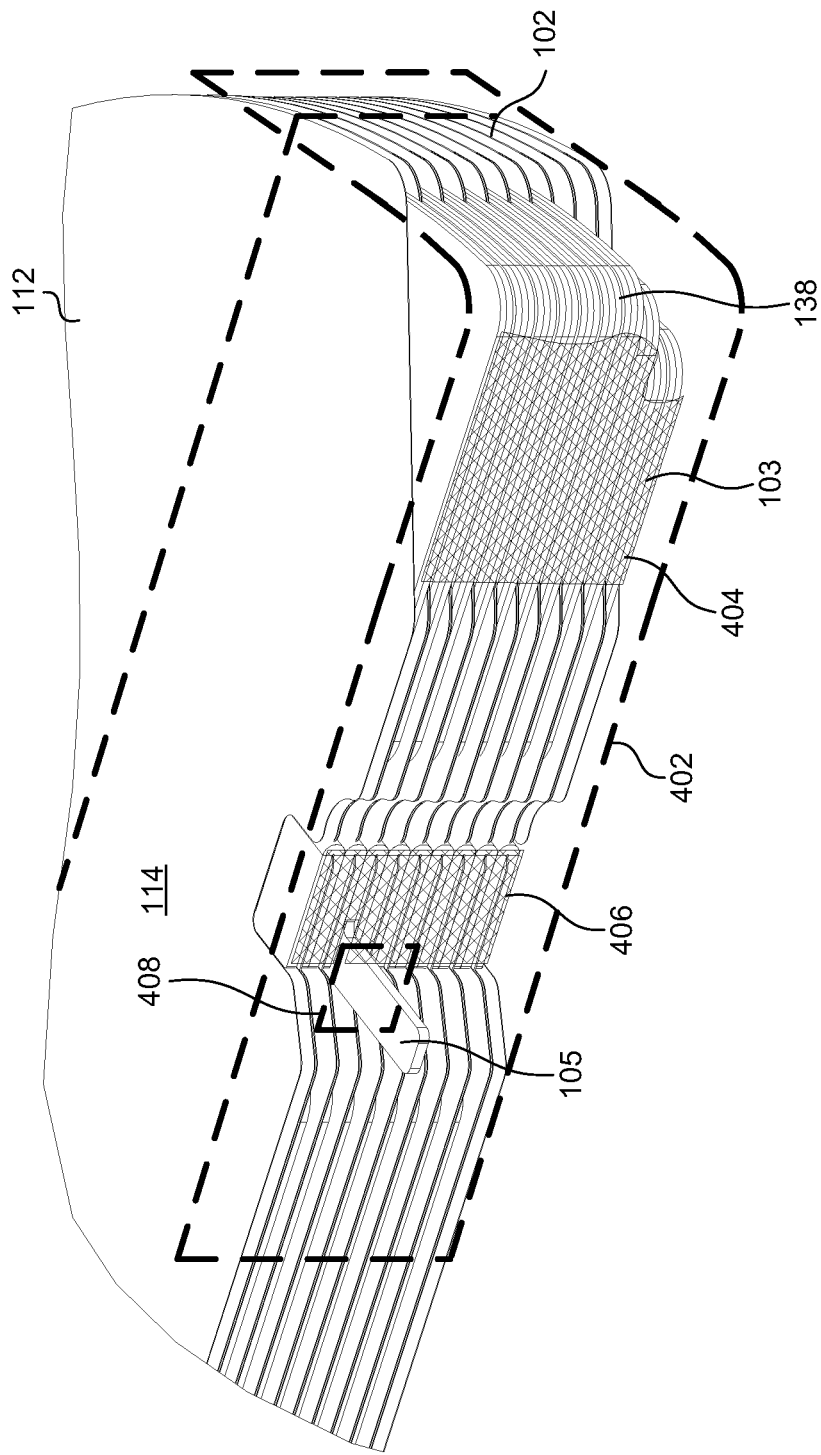
FIG. 4 is a perspective view of a side film applied to a connection area, according to some examples.

FIG. 4 is a perspective view of a side film applied to a connection area, according to some examples. The pocket 112 and the side film 402 are shown in hidden lines to facilitate explanation. Various examples include a side film 402 covering the curved portions of the edge 138 of the remaining portion 114 of the stack 102. In various examples, the side film 402 extends across the planar portion of the edge 138 and onto the remaining portion 114 of the stack 102. In some instances, the side film 402 is bunched around the curved edge 138.

The illustration shows an edge weld 404 disposed on the planar surface 103. The edge weld 404 couples a plurality of layers, such as anodic layers. A second edge weld 406 is shown interconnecting a plurality of cathodic layers. In certain examples, the side film 402 defines an opening 408 through which a terminal, such as the cathode terminal 105, is disposed.

Figure 5:
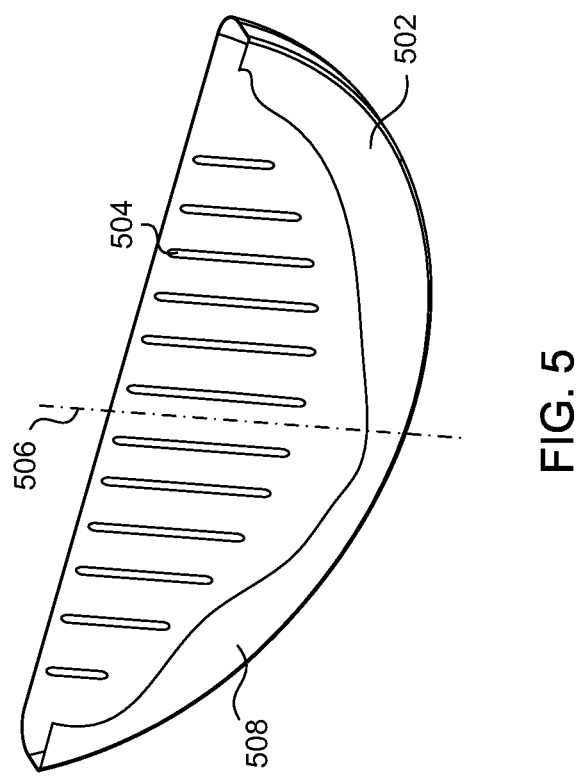
FIG. 5 is a cut-away view of a pocket including channels, according to some examples.

FIG. 5 is a cut-away view of a pocket including channels, according to some examples. In various examples, include a contour disposed on the interior of the pocket 502. In some instances, the contour includes at least one channel 504. Some examples include a plurality of channels. In some examples, at least one channel 540 extends parallel to a diameter 505 of a first major face 508 of the pocket 502. In various examples, the channels provide improved electrolyte flow throughout the case. In certain examples, the case is cathodic, and the channels, allow the case half to act as a cathode opposing the outermost anode.

Figure 6:
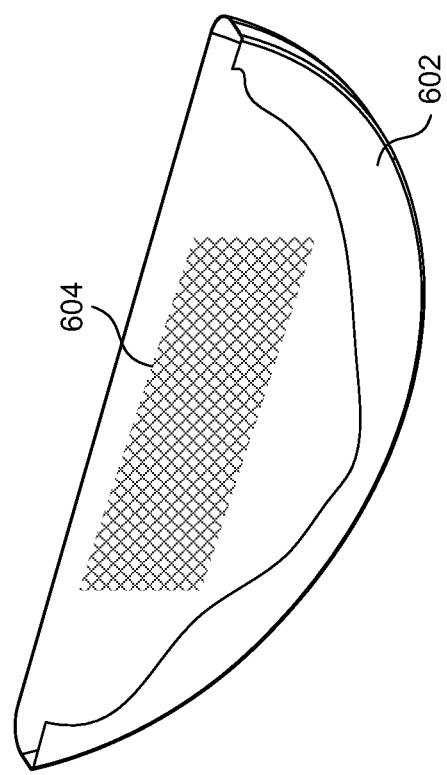
FIG. 6 is a cut-away view of a pocket including knurling, according to some examples.
Figure 8D:
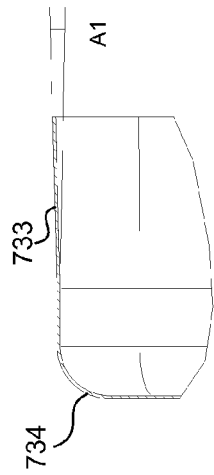
FIG. 8D is section view of section 8D illustrated in FIG. 8C.
Figure 8C:
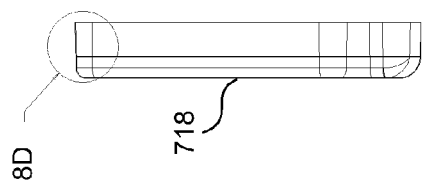
FIG. 8C is a side view of a first shell as illustrated in FIG. 7B.
Figure 8B:
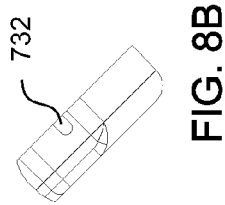
FIG. 8B is a partial top-right view of a first shell as illustrated in FIG. 7B.
Figure 8A:
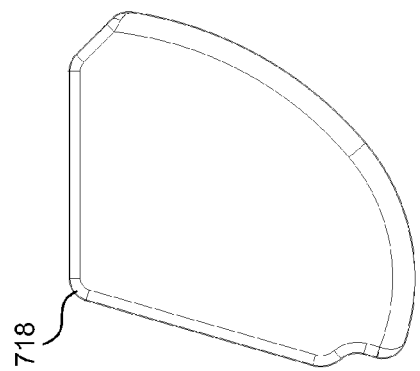
FIG. 8A is a front view of a first shell as illustrated in FIG. 7B.

FIG. 6 is a cut-away view of a pocket including knurling, according to some examples. In various examples, include a contour disposed on the interior of the pocket 602. In some examples, the contour includes at least one knurl 604. Some examples include a plurality of knurls. In some instances, the knurl is included to ease assembly. Additionally, in certain examples, the knurl provides a visual indicator to assembly personnel of what part of the pocket they are viewing.

FIGS. 7A-C provide views of a power source 700 including first and second shells, according to some examples. In some examples, the power source 700 is battery. Various examples include a plurality of substantially planar electrodes disposed in a stack 702. In some examples, the electrodes of the stack 702 are in alignment, with a first major face 704 opposing a second major face 706, with an edge 708 extending between the first major face 704 and the second major face 706. Some examples include a case 710. The case 710 includes two shell or cup-shaped halves in certain examples. In some instances, the case 710 includes one shell or cup-shaped half mateable to a cover. In various examples, the stack 702 is disposed in the power source case 710. In various examples, the power source case 710 has a first exterior face 712 shaped to conform to the first major face 704. In some examples, the case 710 includes a second exterior face 714 shaped to conform to the second major face 706. In various examples, the case 710 includes an exterior edge 716 shaped to conform to the edge 708 of the stack.

Various examples include a first shell 718 such as a clamshell shaped to conform to an exterior 720 of the power source case 710, covering the first exterior face 712 and a portion of the exterior edge 716. Some examples include a second shell 722 shaped to conform to the exterior 720 of the power source case, covering the second exterior face 714 and a remainder of the exterior edge 716. In various examples, the first shell 718 and the second shell 722 are thermoformed.

In various examples, the first shell 718 and the second shell 722 physically and electrically insulate the power source case 710 from the device housing 724. In various examples, the first shell 718 is joined to the second shell 722. In certain examples, the first shell 718 is welded to the second shell 722. Some examples include a housing 724 and case 710 configuration in which an interior space exists between the power source case and the device housing includes interstices. In some examples, the first shell 718 at least partially overlaps the second shell 722, such as by a distance OL. Some examples include an optional film 726 disposed at least partially over the overlap. In some instances, the first shell 718 is removably shaped to conform to the exterior 720 of the power source case 710. In some instances, the second shell 722 is removably shaped to conform to the exterior 720 of the power source case 710.

Some examples include additional films or shells 728. These insulators are, in some instances, shaped to conform to other components, or are otherwise shaped to provide electrical and/or physical insulation between two components. Terminals 730 are additionally illustrated. The terminals 730 are to interconnect electrodes of the power source 700 to other components within an implantable medical device.

FIGS. 8A-D illustrate views of a first shell as illustrated in FIG. 7B. FIGS. 9A-C illustrate views of a second shell as illustrated in FIG. 7B. In some instances, one or more shells, such as shell 718, include a beveled shape 733, such as to accommodate overlap with another shell, such as shell 722. The pictured example includes a shape beveled at the angle A1. Various angles are contemplated. In certain examples, the first shell 718 includes a notch 732, such as to accommodate a terminal, such as terminal 730. In some cases, the first shell 718 includes a contour 734, such as to accommodate or conform to a contoured portion of a power source case 710.

In some examples, the second shell 722 includes a notch 736, such as to accommodate a terminal, such as terminal 730. In some cases, the second shell 722 includes a contour 738, such as to accommodate or conform to a contoured portion of a power source case 710.

Figure 10:
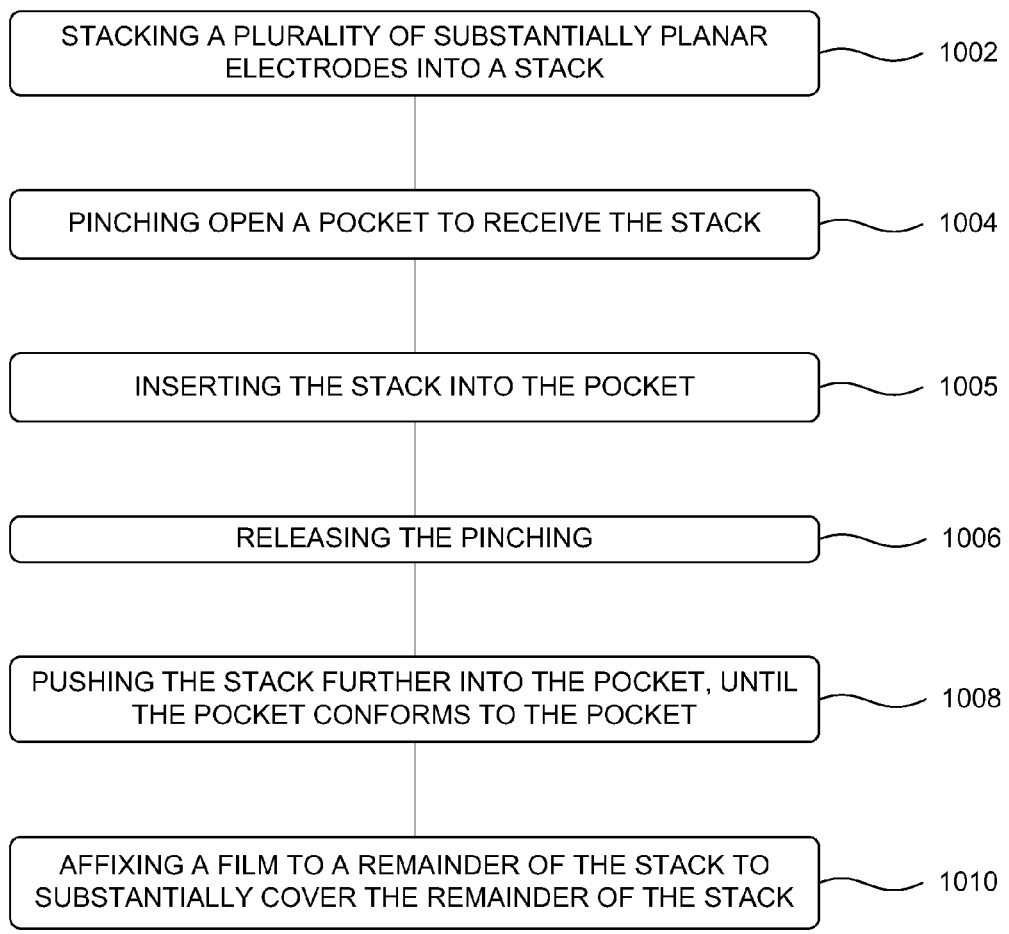
FIG. 10 is a method of constructing a power source, according to some examples.

FIG. 10 is a method of constructing a power source, according to some examples. At 1002, the method includes stacking a plurality of substantially planar electrodes into a stack. Some methods include stacking a plurality of substantially planar electrodes into a stack, in alignment, the stack having a plate-shape with a first major face opposing a second major face, with an edge extending between the first major face and the second major face. At 1004, the method includes pinching open a pocket to receive the stack. Some methods include pinching open a first pocket edge of a pocket toward a second pocket edge of the pocket, opposite the first pocket edge, such that a first pocket major face of the pocket, that extends between the first pocket edge and the second pocket edge, separates from a second pocket major face of the pocket that also extends between the first pocket edge and the second pocket edge and disposing the stack partially into the pocket. At 1005, the method includes inserting the stack into the pocket. At 1006, the method includes releasing the pinching. At 1008, the method includes pushing the stack further into the pocket, until the pocket conforms to the stack. At 1010, the method includes affixing a film to a remainder of the stack to substantially cover the remainder of the stack.

Some methods is contemplated that includes disposing the stack partially into the pocket includes covering a first segment of the first major face of the stack, and pushing the stack further into the pocket comprises covering a second segment of the first major face larger than the first segment.

Some methods is contemplated that includes affixing the film includes affixing a thermoformed film to the remainder of the stack. Some methods is contemplated that includes affixing the film includes conforming the film to the remainder of the stack by thermoforming the film. Some methods is contemplated that includes thermoforming the film includes reducing a film of a thickness of 0.003 inches to a thickness of 0.0005 inches. Some methods is contemplated that includes affixing the film includes adhering the film to the remainder of the stack. Some methods is contemplated that includes affixing the film includes taping over the remainder of the stack, such that the tape adheres to the first major face of the pocket, the second major face, and the remainder of the stack. Some methods include grasping the pocket with one hand and pinching the first pocket edge and the second pocket edge together to separate a first pocket edge from the second pocket edge, and affixing the film with the other hand.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A battery for an implantable medical device, comprising:
a case;
a plurality of substantially planar electrodes disposed in a stack, in alignment, the stack being at least partially disk-shaped with a first major face opposing a second major face, with an edge extending between the first major face and the second major face;
an insulative pocket, with a covered portion of the stack disposed in the pocket, the pocket shaped to conform to the stack with a first portion of the pocket covering a first segment of the first major face, a second portion covering a second segment of the second major face opposite the first segment, and an edge portion covering the edge of the stack, wherein a remaining portion of the stack extends out of the pocket; and
a film disposed over the remaining portion of the stack, substantially covering the remaining portion;
wherein the stack is disposed in the case.

2. The apparatus of claim 1, wherein the pocket is pliable and is molded in a shape that conforms to an exterior of the stack.

3. The apparatus of claim 1, wherein the first major face defines a total segment less than a semi-circle, and the pocket covers a small segment portion smaller than the total segment.

4. The apparatus of claim 1, comprising a side film covering curved portions of the edge of the remaining portion.

5. The apparatus of claim 4, wherein the side film extends across a planar portion of the edge and onto the first major face and the second major face.

6. The apparatus of claim 1, wherein an interior surface of the pocket includes a contour, with electrolyte disposed in the contours.

7. The apparatus of claim 6, wherein the contour includes knurling.

8. The apparatus of claim 6, wherein the contour includes at least one channel.

9. The apparatus of claim 1, comprising tape banded around the covered portion and the remaining portion.

10. A battery for an implantable medical device, comprising a plurality of substantially planar electrodes disposed in a stack, in alignment, with a first major face opposing a second major face, with an edge extending between the first major face and the second major face;
a power source case, the stack disposed in the power source case, the power source case having a first exterior face shaped to conform to the first major face and a second exterior face shaped to conform to the second major face, with an exterior edge shaped to conform to the edge of the stack;
a first shell shaped to conform to an exterior of the power source case, covering the first exterior face and a portion of the exterior edge;
a second shell shaped to conform to the exterior of the power source case, covering the second exterior face and a remainder of the exterior edge; and
a device housing, with the power source case disposed in the device housing, wherein the first shell and the second shell physically and electrically insulate the power source case from the device housing.

11. The apparatus of claim 10, wherein the first shell is joined to the second shell.

12. The apparatus of claim 10, wherein the first shell east partially overlaps the second shell.

13. The apparatus of claim 10, wherein the first shell and the second shell are thermoformed.

14. The apparatus of claim 10, wherein the first shell is removably shaped to conform to the exterior of the power source case and the second shell is removably shaped to confOrm to the exterior of the power source case.

\* \* \* \* \*